United States Patent [19]

Gruber et al.

[11] Patent Number: 5,571,857
[45] Date of Patent: Nov. 5, 1996

[54] PROCESSES FOR PRODUCING ORGANIC SOLVENT FREE URETHANE/ACRYLIC POLYMER LAMINATING ADHESIVE FOR FLEXIBLE PACKAGING

[75] Inventors: Bruce A. Gruber, Emmaus; Richard Derby, Allentown, both of Pa.

[73] Assignee: Air Products and Chemicals, Inc., Allentown, Pa.

[21] Appl. No.: 497,119

[22] Filed: Jun. 30, 1995

Related U.S. Application Data

[63] Continuation of Ser. No. 194,190, Feb. 8, 1994, abandoned.

[51] Int. Cl.⁶ .................................. C08J 3/02; C08K 3/20
[52] U.S. Cl. ........................................... 524/457; 524/507
[58] Field of Search ..................... 524/457, 507

[56] References Cited

U.S. PATENT DOCUMENTS

| | | | |
|---|---|---|---|
| 3,684,758 | 8/1972 | Honig et al. | 524/457 |
| 3,705,164 | 12/1972 | Honig et al. | 524/457 |
| 4,198,330 | 4/1980 | Kaizerman et al. | 525/185 |
| 4,644,030 | 2/1987 | Loewrigkeit et al. | 524/839 |
| 4,927,876 | 5/1990 | Coogan et al. | 524/501 |
| 5,045,601 | 9/1991 | Capelli et al. | 525/327.1 |
| 5,173,526 | 12/1992 | Vijayendran et al. | 524/457 |

FOREIGN PATENT DOCUMENTS

| | | |
|---|---|---|
| 0308115 | 3/1989 | European Pat. Off. . |
| 0405368 | 1/1991 | European Pat. Off. . |
| 0510572 | 10/1992 | European Pat. Off. . |
| 9216576 | 3/1992 | WIPO . |

*Primary Examiner*—Judy M. Reddick
*Attorney, Agent, or Firm*—Michael Leach; William F. Marsh

[57] ABSTRACT

A method for preparing an aqueous adhesive polyurethane/acrylic polymer dispersion by reacting a polyol, a carboxylic acid-containing polyol and a polyisocyanate to form an anionic, water dispersible prepolymer, subsequently chain extending to form the polyurethane component of the polyurethane/acrylic polymer and polymerizing at least one acrylic monomer in the presence of the prepolymer and/or polyurethane to form the acrylic polymer component, characterized by using isophorone diisocyanate as the polyisocyanate and performing the chain extension with a composition comprising a monofunctional amine and a difunctional amine in a 1:4 to 4:1 weight ratio.

6 Claims, No Drawings

PROCESSES FOR PRODUCING ORGANIC SOLVENT FREE URETHANE/ACRYLIC POLYMER LAMINATING ADHESIVE FOR FLEXIBLE PACKAGING

This is a continuation of application Ser. No. 08/194,190 filed 8 Feb. 1994, now abandoned.

TECHNICAL FIELD

The present invention relates to aqueous polymer dispersions comprising polyurethane and acrylic polymer components.

BACKGROUND OF THE INVENTION

There is a need for a water borne, solvent free polyurethane/acrylic polymer (UA) dispersion for film to film lamination of flexible packaging materials.

U.S. Pat. Nos. 3,684,758 and 3,705,164 disclose a process for making stable aqueous polymer dispersions by subjecting vinyl monomers to radical emulsion polymerization in the presence of a stable aqueous dispersion of (a) a high molecular weight cationic polyurethane which is gel-like in character and (b) a high molecular weight polyurethane containing anionic groups, respectively.

U.S. Pat. No. 4,198,330 discloses a polyurethane latex and a polymer of at least one vinyl monomer, the polymer having been obtained by free-radical polymerization of the monomer in the presence of the latex and being characterized as a hard, resinous material at temperatures below about 60° C.

U.S. Pat. No. 4,644,030 discloses a method for making a stable aqueous dispersion of polymeric material comprising:

(A) producing an NCO-terminated polyurethane prepolymer in the presence of inert liquid polymerizable ethylenically unsaturated monomer material;

(B) dispersing the product from (A) in water;

(C) chain-extending the prepolymer in the resulting aqueous dispersion; and (D) subjecting the aqueous dispersion from (C) to vinyl addition polymerization conditions to polymerize the monomer material in-situ.

Also disclosed in U.S. '030 are the resulting aqueous dispersions and their use for making films, sheets and other products.

EP 0 308 115 A2 discloses a surfactant-free aqueous polymer dispersion containing an anionic water-dispersible polyurethane and a vinyl polymer, the dispersion having been obtained by:

(A) forming a solution of an anionic water-dispersible isocyanate-terminated polyurethane in at least one vinyl monomer;

(B) dispersing the solution in an aqueous medium;

(C) chain-extending the polyurethane, and either (D) adding further vinyl monomer, and (E) initiating polymerization of the vinyl monomer, or (F) initiating polymerization of the vinyl monomer, and (G) adding further vinyl monomer during polymerization.

U.S. Pat. No. 5,173,526 discloses a method for making an aqueous polyurethane-vinyl polymer dispersion which comprises:

(a) forming a carboxy-containing, water-dispersible, isocyanate terminated polyurethane prepolymer;

(b) adding a vinyl monomer composition which includes a polyethylenically unsaturated monomer to the prepolymer to form a prepolymer/monomer mixture;

(c) adding a tertiary amine to the prepolymer/monomer mixture;

(d) dispersing the prepolymer/monomer mixture in water;

(e) adding an oil soluble free radical initiator and a chain-extender to the aqueous dispersion; and (f) polymerizing the vinyl monomer and completing chain extension of the prepolymer by heating the aqueous dispersion.

SUMMARY OF THE INVENTION

The present invention is directed to a method for making an aqueous polyurethane-acrylic (UA) polymer dispersion that preferably is free of organic cosolvents. UA polymer dispersions are typically prepared by reacting a polyol, a carboxylic acid-containing polyol and a polyisocyanate to form an anionic, water dispersible prepolymer which is subsequently chain extended to the polyurethane and polymerizing at least one acrylic monomer to form the acrylic polymer. Applicants have discovered that using isophorone diisocyanate as the polyisocyanate and performing the chain extension with a composition comprising a monofunctional amine and a difunctional amine provides a useful laminating adhesive.

In one embodiment, the aqueous UA polymer dispersion is prepared by:

(a) reacting a polyol and isophorone diisocyanate to consume essentially all of the polyol hydroxyl functionality;

(b) adding an isocyanate-reactive compound containing a carboxylic functionality and reacting it with the isophorone diisocyanate, the amount of isophorone diisocyanate present in steps (a) and (b) being sufficient to yield an isocyanate-terminated polyurethane prepolymer having an isocyanate content of greater than 0 wt %;

(c) adding at least one acrylic monomer during the step (b) prepolymer forming reaction;

(d) neutralizing the carboxylic-containing prepolymer with a tertiary amine to yield a prepolymer salt/acrylic monomer mixture;

(e) dispersing the prepolymer salt/monomer mixture in water;

(f) adding a free-radical source and a chain-terminator/extender composition comprising a monofunctional and a difunctional amine; and (g) polymerizing the acrylic monomer and completing chain extension of the prepolymer by heating the aqueous dispersion.

Preferably, steps (a)–(b) are performed in the absence of an organic cosolvent.

When used as a laminating adhesive for film to film lamination, the resulting UA polymer dispersion affords peel values comparable to solvent borne systems.

Surprisingly, the aqueous adhesive composition affords bond retention after cold water soak. Even laminated film pouches made with the adhesive composition have endured boiling water treatment without delamination.

DETAILED DESCRIPTION OF THE INVENTION

The isocyanate-terminated polyurethane prepolymers are commonly produced by reacting organic material containing an average of at least about two active hydrogen atoms per molecule, usually a diol and preferably a polyester polyol, with a stoichiometric excess of a organic diisocyanate. A suitable portion of the organic material also contains, as a means for providing anionic water dispersibility to the prepolymer, at least one comparatively unreactive pendant carboxylic group, which is neutralized with a tertiary amine to the salt form after the prepolymer formation and addition of the monomers, but before the formation of the aqueous dispersion.

The polyisocyanate used in making the prepolymer is isophorone diisocyanate, such as sold by Hüls AG. The isophorone diisocyanate is necessary for good solubilization of the carboxy-containing, isocyanate reactive compound. Both toluene diisocyanate and dicyclohexylmethane- 4,4-diisocyanate are unsuitable for the preparation of the UA polymer dispersion because of the insolubility of dihydroxymethyl-propionic acid in these polyisocyanates.

The present process preferably involves:

(a) reacting a polyol and a sufficient amount of isophorone diisocyanate in the presence of a urethane catalyst at an elevated temperature under an inert (e.g., dry air) atmosphere to consume essentially all of the polyol hydroxyl functionality;

(b) adding a dihydroxyalkanoic acid and reacting it with the isophorone diisocyanate, the amount of isophorone diisocyanate also being sufficient to yield a prepolymer having an isocyanate content>0 wt % and preferably<6 wt %, most preferably<3 wt %;

(c) adding at least one low Tg polymer-forming acrylic monomer during the step (b) prepolymer reaction;

(d) neutralizing the carboxylic-containing prepolymer with a tertiary amine to yield a prepolymer salt/acrylic monomer mixture;

(e) dispersing the prepolymer salt/acrylic monomer mixture in water;

(f) adding a free-radical source and a chain terminator and chain extender composition consisting essentially of a monofunctional amine and a difunctional amine, respectively; and (g) polymerizing the acrylic monomer and completing chain extension of the prepolymer by heating the aqueous dispersion under an inert (e.g., nitrogen) atmosphere.

It is desirable that steps (a) and (b), and preferably steps (a)–(g), are performed without adding any organic solvent in order to afford an organic solvent-free UA polymer dispersion.

Polymeric polyols having molecular weights in the range of 500 to 6,000 which may be used in the preparation of the prepolymer, particularly include diols and triols and mixtures thereof, but higher functionality polyols may also be used, for example, as minor components in admixture with diols. The polyols may be members of any of the chemical classes of polymeric polyols used or proposed for use in polyurethane formulations. In particular, the polyols may be polyesters and/or polyethers with preferred molecular weights from 700 to 3,000.

Polyester polyols which may be used include, hydroxyl-terminated reaction products of polyhydric alcohols such as ethylene glycol, propylene glycol, diethylene glycol, neopentyl glycol, 1,4-butane diol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerization of lactones, for example caprolactone, in conjunction with a polyol may also be used, although they are less preferred since bond strength is lost overtime due to crystallization.

Polyether polyols which may be used include products obtained by the polymerization of a cyclic oxide, for example ethylene oxide, propylene oxide or tetrahydrofuran or by the addition of one or more such oxides to polyfunctional initiators, for example, water, ethylene glycol, propylene glycol, diethylene glycol, cyclohexane dimethanol, glycerol, trimethylol-propane, pentaerythritol or Bisphenol A. Especially useful polyethers include polyoxypropylene diols and triols, poly(oxyethylene-oxypropylene) diols and triols obtained by the simultaneous or sequential addition of ethylene oxide and propylene oxide to appropriate initiators and polytetramethylene ether glycols obtained the polymerization of tetrahydrofuran.

Isocyanate-reactive compounds containing carboxylic groups which may be used in the preparation of the anionic water-dispersible prepolymers include carboxylic group-containing diols and triols, for example, dihydroxyalkanoic acids of the formula:

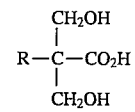

where R is hydrogen or $C_1$–$C_{10}$ alkyl group. The preferred carboxylic-containing. diol is 2,2-dimethylolpropionic acid. If desired the carboxylic-containing diol or triol may be incorporated into a polyester by reaction with a dicarboxylic acid before being incorporated into the prepolymer.

Contemplated as the functional equivalent of the carboxylic-containing, isocyanate-reactive compounds are those isocyanate-reactive materials that contain an acidic functionality other than a carboxylic group, e.g., a sulfate or phosphate group.

The anionic water-dispersible, isocyanate-terminated polyurethane prepolymer is prepared by reacting a stoichiometric excess of isophorone diisocyanate with the polymeric polyol, the carboxylic-functional, isocyanate reactive compound and any other required isocyanate-reactive compounds under substantially anhydrous conditions at a temperature between 30° and 130° C. until the reaction between the isocyanate groups and the hydroxyl groups is substantially complete. To avoid side reactions that may hurt the adhesive power of the composition the prepolymer synthesis should be carried out at or below ~75° C. The isophorone diisocyanate and the isocyanate-reactive components are suitably reacted in such proportions that the ratio of number of isocyanate groups to the number of hydroxyl groups is in the range from about 1.1:1 to about 6:1, preferably within the range of from 1.5:1 to 4:1. If desired, the well-known tin catalysts may be used to assist prepolymer formation.

The mixture of the carboxy-containing water-dispersible polyurethane prepolymer and acrylic monomer is prepared by simply adding an acrylic monomer composition to the prepolymer reaction concomitantly with the addition and reaction of the carboxy-functional, isocyanate reactive compound. The acrylic monomer composition may contain a polyethylenically unsaturated comonomer, but must contain at least one acrylic monomer which is capable of forming a homopolymer having a Tg less than about −20° C. Exemplary of such low Tg polymer-forming acrylic monomers are butyl acrylate and ethylhexyl acrylate.

In addition, the acrylic monomer composition may contain other vinyl monomers in such amounts that the resulting polymer has a Tg less than −20° C. Such suitable vinyl monomers which may be combined with the required low Tg polymer-forming acrylic monomer(s) and the prepolymer include ethylenically unsaturated hydrocarbons, esters and ethers, especially esters of acrylic and methacrylic acids, esters of vinyl alcohol and styrene. Specific examples include butadiene, isoprene, styrene, substituted styrenes, the lower alkyl ($C_1$–$C_6$) esters of acrylic, methacrylic and maleic acids, vinyl acetate and butyrate, acrylonitrile, vinyl methyl, propyl and butyl ethers, vinyl chloride, vinylidene chloride and the like. Suitable polyethylenically unsaturated monomers include butadiene, isoprene, allylmethacrylate, diacrylate esters of $C_2$–$C_6$ diols such as butanediol diacrylate and hexanediol diacrylate, divinylbenzene, divinylether, trimethylolpropane triacrylate and the like.

Prior to dispersing the prepolymer/monomer mixture in water, a tertiary amine is added to the mixture in an amount sufficient to render the prepolymer water dispersible, i.e., an amount to substantially neutralize the carboxylic functionality as is well known in the art. Suitably, the amine is added at about 65 to 1004 amine equivalent per equivalent of carboxylic functionality. It is preferred to add the amine until the dihydroxyalkanoic acid is >80% neutralized.

Tertiary amines that may be used in the practice of the invention are relatively volatile so that they evaporate from the coating upon curing. Examples will include amines of the formula:

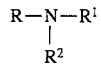

where R, $R^1$ and $R^2$ are independently $C_1$–$C_4$ alkyl and hydroxyalkyl groups. Illustrative of such tertiary amines are triethylamine, dimethylethanol amine, methyldiethanol amine, and methyldiethyl amine.

It is important that the tertiary amine be added to the prepolymer/monomer mixture before the mixture is dispersed in water to assure a stable dispersion. Contrary to the prior art, no quantity of polar organic liquid such as N-methylpyrrolidone need be added to the polymer dispersion to enhance the compatibility of the organic and aqueous phases.

The prepolymer/acrylic monomer mixture may be dispersed in water using techniques well known in the art. Preferably the mixture is added to the water with agitation or, alternatively, water may stirred into the mixture. The chain terminator/extender composition which is reacted with the prepolymer consists essentially of a monofunctional amine (terminator) and a difunctional amine (extender), i.e., a monoamine and a diamine, in a 1:4–4:1 wt ratio, preferably in a 1:3–3:1 wt ratio. Examples of suitable monofunctional chain terminators include amino alcohols, ammonia, primary or secondary aliphatic, alicyclic, aromatic, araliphatic or heterocyclic amines, especially primary aliphatic amines such as ethylamine.

Examples of suitable diamine chain extenders include ethylenediamine, propylenediamine, butylenediamine, hexamethylenediamine, cyclohexylene-diamine, piperazine, toluenediamine, isophoronediamine and the like.

The free radical source or initiator should be an oil soluble material, meaning a free radical generating material that preferentially partitions into the organic phase compared to the aqueous phase, i.e., not substantially soluble in the aqueous phase. Suitable oil soluble free radical initiators include the azo-type initiators such as 2,2-azobis(2,4-dimethylpentanenitrile) and 2,2-azobis(2-methylpropanenitrile) [AIBN]. Redox systems comprising reducing agents and oxidizing agents (free radical initiators) as are well known in the polymerization art can also be used, but the free radical initiator should be oil soluble.

The free radical polymerization of the monomer mixture and the chain extension of the prepolymer is conducted at an elevated temperature, namely a temperature sufficient to liberate free radicals at a rate that sustains the polymerization reaction and to complete chain extending the prepolymers, since the chain extending reaction begins to precede upon the addition of the chain terminator/extender composition to the aqueous dispersion. A suitable temperature range would 50° to 90° C., preferably 60° to 80° C.

The amount of chain terminator/extender composition employed should be approximately equivalent to the free isocyanate groups in the prepolymer, the ratio of nitrogen atoms containing active hydrogens in the chain terminator/extender composition to isocyanate groups in the prepolymer, preferably being in the range from 0.7 to 1.3:1. Of course when water is also employed as a chain extender, these ratios will not be applicable since the water, functioning as both a chain extender and dispersing medium, will be present in a gross excess relative to the free isocyanate groups.

Polymerization of the acrylic and vinyl monomers may be effected by one of two methods. In the first method, the monomers are added and may swell the polyurethane prepolymer as it is being formed before the tertiary amine is added. The monomers are then polymerized using the oil soluble free radical initiator. The proportion of the monomers used, based on total solids and the resulting dispersion, is suitably from 25 to 75%, preferably from 40 to 60%.

In the second method, polymerization of the monomers involves initially adding a portion of the monomers to the prepolymer during its preparation, neutralizing with tertiary amine and dispersing the prepolymer/monomer mixture in water followed by polymerization during which additional monomers (the same or different) are added during the polymerization process. Alternatively, the second portion of the monomer composition can be added to the prepolymer/monomer dispersion after amine addition and equilibrated by stirring before the polymerization is begun.

The UA polymer dispersions obtained can comprise 20 to 60 wt % solids and are employed as laminating adhesives in which films of such materials as metal foils, e.g., aluminum, and polymeric materials, e.g., polyesters and low density polyethylene, are laminated to one another and to each other. Suitable lamination procedures include any of those conventionally used in the film to film lamination art, such as in-line lamination or heat seal process, in which the lamination adhesive composition is applied to one side of either or both of the films by methods including gravure coating at add-ons of about 0.25 mg/cm² and laminating the adhesive coated film surface to the other film surface, preferably under pressure. Typical laminating conditions would comprise 20 psi (0.14N/m²), 2 sec and 200° F. (93° C.). Bond strength will increase with time even at ambient temperatures.

EXAMPLE 1

This examples shows the preparation of aqueous polyurethane/acrylic (UA) polymer dispersions using the ingredients in Table 1.

TABLE 1

| Ingredient | Run A | Run B | Run C | Run D |
|---|---|---|---|---|
| Polyester Polyol | Polycaprolactone (14.37) | Polycaprolactone (14.35) | Polycaprolactone (14.35) | Neopentyl Adipate (14.37) |
| Catalyst | DBTDL (0.08) | DBTDL (0.08) | DBTDL (0.08) | DBTDL (0.08) |
| Diisocyanate | IPDI (4.69) | IPDI (4.69) | IPDI (4.69) | IPDI (4.69) |
| Monomer | BA (19.45) | BA (19.43) | BA (19.42) | BA (19.45) |
| Chain Teminator/-Extender | EDA/EA (0.1/0.2) | EA (0.4) | Glycine (0.46) | EDA/EA (0.1/0.2) |
| Carboxylic-containing compound | DMPA (1.4) | DMPA (1.4) | DMPA (1.4) | DMPA (1.4) |
| Neutralizing Amine | TEA (1.06) | TEA (1.06) | TEA (1.06) | TEA (1.06) |
| Initiator | VAZO 64 (0.07) | VAZO 64 (0.07) | VAZO 64 (0.07) | VAZO 64 (0.07) |
| Water | (58.33) | (58.27) | (58.22) | (58.33) |
| Acetone | (0.25) | (0.25) | (0.25) | (0.25) |

(parts by weight)

A clean, dry jacketed glass reactor was equipped with a thermocouple, agitator and nitrogen/air atmosphere capability. Into the reactor was charged the polyol, the urethane catalyst dibutyltin dilaurate (DBTDL), and isophorone diisocyanate (IPDI). The contents were reacted under an atmosphere of dry air at 75° C. to consume all of the polyol hydroxyls.

To the reactor was then added dimethylolpropionic acids (DMPA) and the reaction allowed it to proceed at the elevated temperature until the DMPA was all consumed. The prepolymer free isocyanate content was greater than zero at this point. During this reaction, the forming prepolymer was diluted with butyl acrylate (BA) to reduce the viscosity.

The reactor contents were cooled and the DMPA-containing prepolymer was neutralized with triethylamine (TEA).

The prepolymer salt/monomer mixture was dispersed with agitation into water at room temperature. Vazo 64 free radical initiator dissolved in the acetone was added to the dispersion. (The addition of even this small amount of acetone can be avoided by adding the initiator dissolved in a portion of the liquid monomer.) The remaining free isocyanate functionality was reacted with the chain terminator/extender composition comprising one or more of the following as shown in Table 1: Ethylenediamine (EDA), ethanolamine (EA), and glycine. The reactor atmosphere was changed to nitrogen, and the contents were heated to the decomposition temperature of the initiator (about 75° C.) to polymerize the monomer and complete the chain extension.

EXAMPLE 2

The aqueous polyurethane/acrylic polymer dispersions of Example 1 were evaluated for peel resistance (N/m) of Mylar polyester or low density polyethylene films to aluminum foil laminates. The samples were coated at 0.25 mg/cm$^2$ and dried at room temperature. They were heat sealed at 200° F. (93° C.) and pulled on an Instron tester at 2 in/min (5.08 cm/min).

TABLE 2

| Polymer Run (Assembly) | Initial Peel | 1 Week Age Peel | 24 Hour Water Soak Peel |
|---|---|---|---|
| A (Foil/Mylar PE) | 3.33 | 0.96 | 1.23 |
| A (Foil/LDPE) | 0.00 | 0.11 | N/A |
| B (Foil/Mylar PE) | 0.88 | 0.26 | 0.04 |
| B (Foil/LDPE) | 0.70 | 0.61 | N/A |
| C (Foil/Mylar PE) | 3.24 | 3.24 | 0.04 |
| C (Foil/LDPE) | 0.00 | 0.04 | N/A |
| D (Foil/Mylar PE) | 3.33 | 2.63 | 2.45 |
| D (Foil/LDPE) | 2.63 | 2.80 | 2.80 |

Peel values — × 10$^{-4}$ N/m

It can be seen from the data in Table 2 that the use of a chain terminator/extender containing both ethanolamine and ethylenediamine in making the adhesive composition (Runs A and D) resulted in 24 hour water soak peel values significantly greater than that for Runs B and C. In addition, the use of the neopentyl adipate polyester polyol in Run D showed significantly greater 24 hour water soak peel values than the Run A composition which used polycaprolactone.

STATEMENT OF INDUSTRIAL APPLICATION

The present invention provides a method for making a polyurethane/-acrylic polymer dispersion suitable for use as a laminating adhesive in making film to film laminates.

We claim:

1. In a method for preparing an aqueous polyurethane/acrylic polymer dispersion by reacting a polyol, a carboxylic acid-containing polyol and a polyisocyanate to form an anionic, water dispersible prepolymer which is subsequently chain extended to form the polyurethane component of the polyurethane/acrylic polymer and polymerizing at least one acrylic monomer in the presence of the prepolymer and/or polyurethane to form the acrylic polymer component, the improvement for providing an adhesive composition which comprises using isophorone diisocyanate as the polyisocyanate and performing the chain extension with a composition comprising a monofunctional amine and a difunctional amine, the monofunctional amine being selected from the group consisting of amino alcohols, ammonia, primary and secondary aliphatic, alicyclic, aromatic, araliphatic and heterocyclic amines, the monofunctional amine and the difunctional amine in a 1:4 to 4:1 weight ratio.

2. The method of claim 1 in which the difunctional amine is selected from the group consisting of ethylenediamine, propylenediamine, butylenediamine, hexamethylenediamine, cyclohexylenediamine, piperazine, toluenediamine and isophoronediamine.

3. The method of claim 2 in which the monofunctional amine and the difunctional amine are in a 1:3 to 3:1 wt ratio.

4. The method of claim 1 in which the monofunctional amine is ethanolamine and the difunctional amine is ethylenediamine.

5. The method of claim 1 in which the monofunctional amine is ethanolamine and the difunctional amine is ethylenediamine.

6. In a method for preparing an aqueous polyurethane/acrylic polymer dispersion by reacting a polyol, a carboxylic acid-containing polyol and a polyisocyanate to form an anionic, water dispersible prepolymer which is subsequently chain extended to form the polyurethane component of the polyurethane/acrylic polymer and polymerizing at least one acrylic monomer in the presence of the prepolymer and/or polyurethane to form the acrylic polymer component, the improvement for providing an adhesive composition which comprises using isophorone diisocyanate as the polyisocyanate and performing the chain extension with a composition comprising a monofunctional amine and a difunctional amine, the monofunctional amine being selected from the group consisting of amino alcohols, ammonia, primary and secondary aliphatic, alicyclic, aromatic, araliphatic and heterocyclic amines and the difunctional amine being selected from the group consisting of ethylenediamine, propylenediamine, butylenediamine, hexamethylenediamine, cyclohexylenediamine, piperazine, toluenediamine and isophoronediamine, the monofunctional amine and the difunctional amine in a 1:4 to 4:1 weight ratio.

* * * * *